United States Patent Office 2,952,686
Patented Sept. 13, 1960

2,952,686

N-(2-PYRIDYL)-N-p-BROMOBENZYL-N'-METHYL-N'-ETHYL-ETHYLENEDIAMINE

Hermann Engelhard, Planckstrasse 6a, Gottingen, Germany; Carl Credner, Senheimerstrasse 25, Berlin-Frohnau, Germany; and Gerhard Renwanz, Sandgrasweg 28, Berlin-Tegel, Germany No Drawing. Filed Apr. 29, 1958, Ser. No. 731,638

Claims priority, application Germany Aug. 12, 1954

1 Claim. (Cl. 260—296)

This invention relates to pyridyl-bromobenzyl-dialkyl diamines and is a continuation-in-part of our application Serial No. 527,652 filed August 10, 1955, now Patent No. 2,843,595.

The novel compound of the present invention is N-(2-pyridyl) - N - p - bromobenzyl - N' - methyl - N' - ethylethylene diamine which is hereinafter referred to as "Compound I."

N - (2 - pyridyl) - N - p - bromobenzyl - N'.N' - dimethyl-ethylene diamine, (Hibernon) is known as an anti-histaminic. It is also known that this compound has a local anaesthetic effect.

It has now been found that as compared with this known pyridyl-bromobenzyl-dialkyl diamine, the action of compound I as a local anaesthetic is nearly twice as great whilst it also has a higher anti-acetylcholine effect which is of importance in treating certain allergic conditions.

The results obtained are shown in the following table.

|  | Hibernon | Compound I |
|---|---|---|
| Anti-histaminic activity (determined according to Schild) | $5.96 \times 10^{-9}$ | $8.2 \times 10^{-9}$ |
| Anti-acetyl choline activity—log ED 50 (isolated guinea pig intestine) | 5.57 | 6.30 |
| Local anaesthesia in the cornea of a rabbit (Procaine-1) | 9.2 | 17.2 |
| Toxicity DL 50 S.C. (mouse) mg/kg | 163 | 199 |

The following example illustrates how compound I may be prepared.

Example

A solution of 179 g. of 2-(β-methyl-ethyl-aminoethyl-amino)-pyridine in about 500 cc. of toluene was added dropwise and while stirring to a suspension of 42 g. of sodium amide in about 40 cc. of toluene, the mixture being heated for 3 hours at 100° C., thereafter cooled to 45° C., and a slightly heated solution of 125 g. of p-bromobenzyl bromide in about 125 cc. of toluene was then added dropwise. When the latter had been added, the reaction mixture was again heated to about 100° C. and maintained at this temperature for 4 hours. It was then cooled to room temperature, mixed with excess hydrochloric acid and thoroughly shaken. The toluene layer was separated, while the aqueous layer was saturated with potassium carbonate and shaken with ether. After being dried over caustic soda, the ether was distilled off and the brown oil which remained was fractionated in vacuo. There was obtained a first running of about 114 g. which consisted essentially of methyl-ethyl-aminoethyl-aminopyridine. There was then obtained about 140 g. of N-(2-pyridyl)-N-p-bromobenzyl-N'.N'-methyl-ethyl-ethylene diamine as a clear yellow viscous base with a boiling point of 180° to 200° C. at 1 to 2 mm. Hg. The base formed an acid maleate of melting point 108° C. and a perchlorate of melting point 147° C.

What we claim is:
The compound N-(2-pyridyl)-N-p-bromobenzyl-N'-methyl-N'-ethyl-ethylene diamine.

References Cited in the file of this patent

UNITED STATES PATENTS

| 2,406,594 | Djerassi et al. | Aug. 27, 1946 |
| 2,569,314 | Howard | Sept. 25, 1951 |
| 2,572,569 | Howard | Oct. 23, 1951 |
| 2,585,239 | Granatek | Feb. 12, 1952 |
| 2,607,778 | Phillips | Aug. 19, 1952 |
| 2,727,898 | Grant et al. | Dec. 20, 1955 |
| 2,843,595 | Engelhard et al. | July 15, 1958 |

FOREIGN PATENTS

| 651,596 | Great Britain | Apr. 4, 1951 |